United States Patent [19]
Holmes et al.

[11] 3,822,602
[45] July 9, 1974

[54] AXIALLY ADJUSTABLE GYRO

[75] Inventors: James Holmes; William Robertson, both of Edinburgh, Scotland

[73] Assignee: Ferranti Limited, Hollinwood, Lancashire, England

[22] Filed: Oct. 18, 1972

[21] Appl. No.: 298,515

[52] U.S. Cl. .................. 74/5 R, 310/67 R
[51] Int. Cl. ........................... G01c 19/06
[58] Field of Search ......... 74/5 R, 5 F, 572, 573, 74/574, 5.7, 5.8, 5.9; 310/67 R

[56] References Cited
UNITED STATES PATENTS

| | | | |
|---|---|---|---|
| 1,543,849 | 6/1925 | Hibbard | 74/572 X |
| 2,410,002 | 10/1946 | Bach | 74/5 X |
| 2,771,778 | 11/1956 | Ryberg | 74/5 |
| 2,929,944 | 3/1960 | Shewmon | 310/67 R |
| 3,071,421 | 1/1963 | Jones et al. | 74/5 X |
| 3,203,260 | 8/1965 | Pierry et al. | 74/5.7 |
| 3,512,020 | 5/1970 | Konet | 310/67 R |
| 3,719,092 | 3/1973 | Quinby | 74/5 R |

Primary Examiner—Manuel A. Antonakas
Attorney, Agent, or Firm—Cameron, Kerkham, Sutton, Stowell & Stowell

[57] ABSTRACT

A gyroscope rotor is made so that its axial configuration may be simply adjusted by providing a resilient rim having grooves formed in it. Screws around the rim enable the resilient portion to be compressed so as to alter the configuration.

7 Claims, 1 Drawing Figure

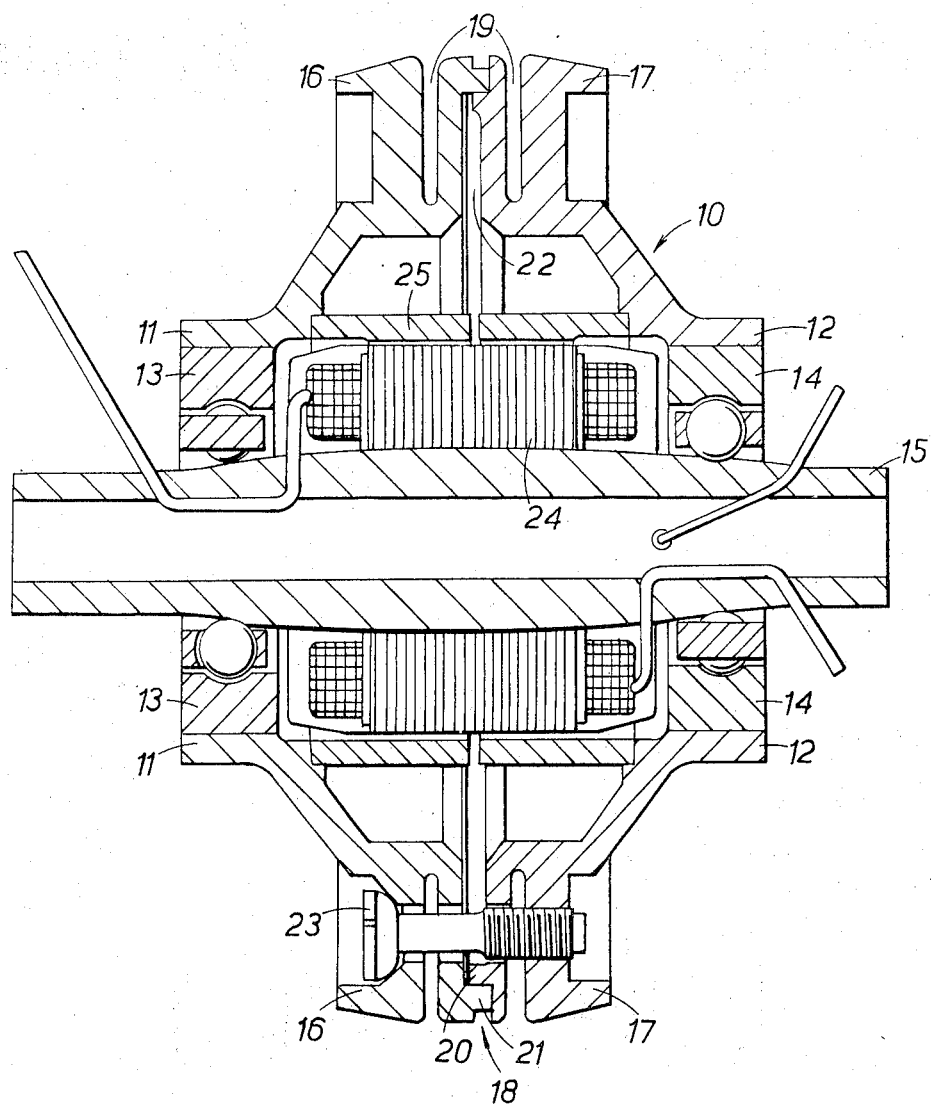

AXIALLY ADJUSTABLE GYRO

This invention relates to gyroscopes, and particularly to the rotors for gyroscope motors.

The rotor of a gyroscope is necessarily a relatively massive object which has to be supported for high speed rotation about a shaft. The rotor can be supported for such rotation by a pair of ball races of the angular contact type, or alternatively by so-called "gas bearings." In bearings of the former type a degree of pre-load in the axial direction is beneficial for drift-free operation of the gyro, and in the latter type there is an optimum value of clearance in the axial direction, the pre-load being developed in operation by the gas flow. The term "axial configuration" is used hereafter to refer to both the adjustment of axial pre-load, which involves no change in axial dimensions, and the adjustment of the clearance in a gas bearing gyro, which does result in a change in the axial dimensions of the gyro rotor. The term "bearing" may be taken as referring both to ball races and the appropriate corresponding parts of gas bearings of different types.

Various methods of adjusting the axial configuration of a gyro rotor are known. Some of these involve trial assembly and dismantling of the gyro in order to lap surfaces or insert shims. These methods have obvious disadvantages. Another method involves retaining each bearing in position by means of a retaining ring which may be screwed into or out of the hub of the gyro to adjust each bearing. Such arrangements require great care to be taken to locate the retaining rings correctly since the screw threads are usually of very fine pitch. Also each bearing requires adjustment separately.

It is an object of the invention to provide a gyrorotor the axial configuration of which may be simply and accurately adjusted.

According to the present invention there is provided a gyro-rotor comprising two axially spaced hub portions each carrying a bearing arranged to support the rotor for rotation about a shaft, and an annular rim having two end portions each rigidly connected to a separate one of the hub portions and a portion resilient in an axial direction, and screw means interconnecting the two end portions of the rim whereby the resilient portion of the rim may be distorted and the axial configuration of the rotor adjusted.

Preferably the resilient central portion of the rim is provided by forming one or more radial grooves in the annular rim.

An embodiment of the invention will now be described with reference to the accompanying drawing. This shows a sectional side elevation of a gyro-rotor for a gyro having ball bearings.

Referring now to the drawing, the gyro-rotor 10 consists of two main parts, namely the central hub and the annular rim. The central hub is made in two axially spaced parts 11 and 12 each of which carries at its outer end a ball-race 13 and 14 respectively. These bearings support the rotor 10 for rotation about a stationary shaft 15, and are secured to their respective parts of the central hub by means of a suitable cement.

The annular rim of the rotor comprises three portions. The two end portions 16 and 17 are rigidly connected to their respective hub portions 11 and 12, the rim and hub portions preferably being integral. The central portion 18 of the rim is resilient in an axial direction and interconnects the two end portions 16 and 17 of the rim. In the embodiment shown the entire rim is split into two parts about a plane passing through the center of the rim and perpendicular to the axis of rotation. Each part comprises one end portion and half of the resilient portion.

The resilient portion 18 of the annular rim is produced by forming radial grooves in the center part of the rim. As shown in the drawing each part of the rim has an outwardly directed groove 19 machined in it. The two parts of the rim are formed with cooperating peripheral flanges 20 and 21 arranged so that when the two parts are fitted together a third, inwardly directed, groove 22 is formed. The flanges also prevent relative radial movement of the two parts of the rotor rim. The two parts of the rim are secured together by means of a number of screws 23 spaced around the rim. These screws are arranged so that they may pull the outermost parts of the rim 16 and 17 towards one another.

As shown in the drawing the rotor 10 is hollow, and contains the drive motor for the gyro. The motor comprises a cylindrical rotor 25 secured to the gyro rotor 10 and a wound stator 24 secured to the shaft 15.

The axial pre-load on the bearings 13 and 14 is the result of applying a force which attempts to move the outer parts of the two bearings axially towards each other. The effect of tightening the screws 23 is to distort the grooves 19 and 22, thus compressing the rim and developing a force attempting to move the central portions of the rotor axially inwards. The force necessary to apply the required bearing pre-load is small, and is easily provided by the screws 23. The screws must all be moved equally to avoid misalignment of the parts of the rotor.

Similarly in the care of a gas bearing gyro-rotor, the screws 23 act to actually move the hub portions of the rotor towards or away from one another in an axial direction so as to reduce or increase the bearing clearance.

The gyro-rotor described above is just one example illustrative of the principle used in its construction. The number of grooves in the rim may be varied as required. The minimum requirements is for a single inwardly directed groove, and in the other extreme the central portion of the rim may have a bellows-like construction. The rotor need not be split about a diameter as described above, though this may be necessary for ease of manufacture. Equally, the central resilient portion of the rim may be made separately from the rest of the rim.

What we claim is:

1. A gyro rotor comprising two axially spaced hub portions each carrying a bearing arranged to support the rotor for rotation about a shaft, and an annular rim having two end portions each rigidly connected to a separate one of the hub portions and a portion between the two end portions resilient in an axial direction, and screw means interconnecting the two end portions of the rim whereby the resilient portion of the rim may be distorted and the axial configuration of the rotor adjusted.

2. A gyro-rotor as claimed in claim 1 in which the circumference of the annular rim is provided with at least one radial groove.

3. A gyro-rotor as claimed in claim 1 in which the rotor is made in two parts each comprising a hub portion and its corresponding end portion, the two parts being arranged to cooperate with one another to form the resilient portion of the rim.

4. A gyro rotor as claimed in claim 3 in which the two parts of the rotor cooperate to define an inwardly directed radial groove.

5. A gyro rotor as claimed in claim 1 in which the screw means comprise a number of screws located around the circumference of the rotor, each screw passing through the resilient portion of the rim.

6. A gyro rotor as claimed in claim 5 in which the screws are spaced equidistant from one another around a circle coaxial with the rotor.

7. A gyro rotor as claimed in claim 1 in which the bearings are formed by ball races.

* * * * *

UNITED STATES PATENT OFFICE
CERTIFICATE OF CORRECTION

Patent No. 3,822,602　　　　　Dated July 9, 1974

Inventor(s) James Holmes et al.

It is certified that error appears in the above-identified patent and that said Letters Patent are hereby corrected as shown below:

Cover page, after item [21], insert
-- [30] Foreign Application Priority Data
　　　Oct. 20, 1971 Great Britain 48702/71--;
in item [56], opposite "Attorney, Agent or Firm", "Kerkham" should read --Kerkam--.

Signed and sealed this 29th day of October 1974.

(SEAL)
Attest:

McCOY M. GIBSON JR.　　　　　C. MARSHALL DANN
Attesting Officer　　　　　　Commissioner of Patents